United States Patent Office 3,135,666
Patented June 2, 1964

3,135,666
PROCESS FOR THE PRODUCTION OF NUCLEOSIDES AND NUCLEOTIDES BY MICROORGANISMS
Takeshi Hara and Yoshihisa Koaze, Kanagawa-ken, and Yujiro Yamada and Michio Kojima, Tokyo, Japan, assignors to Meiji Seika Kabushiki Kaisha, Tokyo, Japan, a corporation of Japan
No Drawing. Filed Dec. 12, 1961, Ser. No. 158,886
Claims priority, application Japan Dec. 16, 1960
3 Claims. (Cl. 195—28)

The present invention relates to a process for the production of nucleosides and nucleotides in which nucleic acid bases, their precursors or a mixture thereof added in a culture medium as substrate is readily converted, in good yield, by enzymic action of selected microorganism to comparatively single nucleoside and nucleotide which are accumulated and then recovered.

Hitherto, nucleosides and nucleotides are obtained by synthetic processes or process using organisms. According to the synthetic process nucleic acid bases may be relatively easily produced but the reaction, by which nucleic acid bases are converted to nucleosides by adding ribose, would be followed by the production of various isomers, therefore the yield of nucleosides production is bad. On the other hand, the organisms, in general, produce themselves nucleotides from low molecular compounds, furthermore synthesize polymer nucleic acid compounds from nucleotides and decompose them to the corresponding nucleic acid bases, nucleosides and nucleotides and mutually alter them. The content and proportion of these compounds are, however, naturally limited to certain degree. Therefore, in the latter process it is very rare to retain specially large amount of the specific intermediates and to be industrially utilized. Now, in connection with the study on the mechanism of nucleic acid metabolism, the accumulating phenomena of the intermediates resulting from nucleic acid metabolism using mutant strains of microorganisms have been frequently studied and it has been known that said phenomenone would be liable to occur under unnatural conditions, for example, special restricted cultivation. Further it has been reported that the microorganisms which have the ability to accumulate some noticeable amount of the mixture of nucleotides have been selectively obtained. The desired accumulated substances produced by such microorganisms are, however, meager in their quantity to be industrially utilized, because the accumulated substances contain various analogous substances which are difficultly separated individually. Therefore, the yield would be decreased so that it may not be carried into effect.

We, the inventors, have continuously studied several years ago the metabolites of a number of microorganisms, that is to say, the fungi and yeasts, i.e., Zygomycetes, Ascomycetes, Basidiomycetes and Fungi Imperfecti and the like, the actinomycetes, i.e., Streptomyces, Nocardia and Actinomyces and the like, and bacteria, i.e., Gram-positive and Gram-negative bacteria: for example, Bacillus coli, Bacillus subtilis, Streptomyces kanamyceticus, Saccharomyces cerevisiae, Penicillium chrysogenum, Aspergillus oryzae, Aspergillus niger and the like, their type culture, their mutants and their nutrient-requiring strains obtained by any mutation-induced means such as ultra-violet irradiation and 2,6 diamino purine treatment. As the result of our study, we have found some microorganisms, particularly nutrient-requiring mutants which have the ability to accumulate a large amount of ribosides (nucleosides) or ribotides (nucleotides) in culture medium such as Gray and Tatum's media, Dulaney's media, Henneberg's media, Czapek's media and the like which were added with a small amount of amino acids or of a mixture thereof as well as comparatively large amount of natural nucleic acid bases or their precursor or their mixture, for example, adenine, guanine, hypoxanthin, xanthine, uracil, cytosine, thimine, 4-amino-5-imidazol carboxamide etc. For example, when a mutant of Bacillus subtilis was cultured in said culture medium in which 200 γ/cc. of adenine were added, about 200 γ/cc. of adenosine were accumulated in the culture medium in the form of almost single nucleoside. Further the ability could be increased by improvement of the culture condition. In the other cases, we have also observed that the corresponding nucleoside and nucleotides such as inosine, guanosine, adenylic acid, inosinic acid and guanylic acid could be converted and accumulated in the culture medium from hypoxanthine, guanine, hypoxanthine, guanine added respectively. We have further confirmed that cell-free extract of cultured mycelium have ability to add enzymically ribose and phosphoribose to the nucleic acid bases. In this case if nucleic acid bases are added in the medium as the raw material these bases would be subjected to biochemical reaction and converted to relatively single nucleoside and nucleotide, even if the ribose, phosphoribose or other ribosides and ribotides are not specifically added. Further if one or more of these substances is (or are) included in the medium, the reaction may be more easily conducted. The mechanism of these reactions will be supposed to be derived from usual biochemical reaction. Due to our study on the relation between the nutrient-requiring property and accumulation phenomena, we have ascertained that if the microorganisms are selected in the aforesaid manner, such microorganisms as can effectively be utilized in the production of nucleosides and nucleotides may be discovered. By this procedure, the disadvantage in the hitherto known processes may be eliminated.

According to the present invention, a process for the production of nucleosides and nucleotides by microorganisms is provided which comprises culturing type culture strain, mutant strain or its auxotroph strain obtained by the mutation-induced means such as ultraviolet ray irradiation or 2.6-diaminopurine treatment in the culture medium in which nucleic acid bases or their precursors were added, selecting the desired strain which has the ability to accumulate a large amount of nucleoside or nucleotide in the single or relatively single form, converting said nucleic acid bases, their precursors or a mixture thereof by said selected strain itself or enzymic action of said strain to nucleosides or nucleotides to accumulate in the culture medium and recovering them. According to the present invention, all of the microorganisms selected in such a manner as mentioned above may be utilized as it is or enzymically so that it has no necessity to limit the kind of microorganisms which can be utilized in this invention.

The present invention will be explained in detail by way of examples in which purine-requiring mutant, Bacillus subtilis 160–88 and Bacillus subtilis 160–151 derived from Bacillus subtilis Marburg 160 were employed as the typical strain.

*Example 1*

The purine-requiring mutant derived from Bacillus subtilis Marburg 160 by ultraviolet ray irradiation and 2.6-diamino purine treatment was cultured under aerobic condition at 37° C., 40 hours in a culture media of the following composition and centrifuged to separate the solid matter containing mycelium. The supernatant was concentrated to 1/10 volume and subjected to the paper-chromatography using methyl isobutyl ketone-acetic acid-water solvent. After drying, Rf of ultra-violet absorbed fraction was compared with that of standard nucleic acid compound. By this procedure, we selected the required strain which accumulated a considerable amount of a substance showing Rf corresponding to that of adenosine and we obtained *Bacillus subtilis* 160–88 and *B. subtilis* 160–151.

Composition of the medium:

| | Percent |
|---|---|
| Glucose | 0.5 |
| Powder of amino acids mixture | 0.05 |
| Meat extract | 0.0005 |
| L-tryptophane | 0.003 |
| $MgSO_4 \cdot 7H_2O$ | 0.02 |
| $KH_2PO_4$ | 0.846 |
| KOH | 0.226 |
| Sodium citrate ($2H_2O$) | 0.05 |
| $(NH_4)_2SO_4$ | 0.1 |
| NaCl | 0.5 |
| Adenine | 0.02 |

The culture broth resulted from the cultivation of said *Bacillus subtilis* 160–88 in aforesaid medium was subjected to a paper-chromatography. The fraction showing the same Rf as that of adenosine was extracted with water. The extract was dried to give white powder. Assay of this product itself or the mixture thereof with adenosine by chromatography showed that Rf thereof was always identical with that of adenosine. Further the ultra-violet obsorption spectrum of its aqueous solution was observed to be identical with that of adenosine. Further, the basic substance fraction obtained by usual hydrolysis of said powder was ascertained by paper chromatography that it was adenine and its ultra-violet absorption spectrum was also identical with that of adenine. The neutral substance fraction showed the characteristics of pentose by orcinol-reaction and was ascertained by paper chromatography that it was ribose. Therefore, it was confirmed that the substances accumulated by said microorganisms in the culture medium contained adenosine.

0.05 ml. of said 1/10 volume concentrate of the culture broth obtained by the cultivation of *Bacillus subtilis* 160–88 was treated in the same manner as mentioned above by paper chromatography to cut away adenosine containing portion and extracted with 5 ml. of 0.1 N hydrochloric acid for 20 minutes. The extract showed the absorption at 258 m$\mu$. The calculation of the absorption coefficient showed that 100–200 $\gamma$/ml. of adenosine were present in the culture broth. That is to say, it was ascertained that 20–50% of adenine added were converted to adenosine. The most of the residual adenine not converted to adenosine were retained unchanged in the culture medium. We have found that a small amount of adenine added were deaminated to hypoxanthine. Any other nucleic acid compounds were insignificantly found.

We have succeeded in the production of adenosine from adenine in the glucose-containing salt buffer solution using mycelium of said *Bacillus subtilis* 160–88 washed with salt buffer solution or cell-free extract prepared from aforesaid mycelium.

Example 2

A loopful of the slant culture of *Bacillus subtilis* Marburg 160–88 on bouillon-glucose medium was inoculated in 10 ml. of a sterilized culture medium which contains 4 g./l. of meat-extract, 10 g./l. of peptone, 1 g./l. of glucose, pH 6.6–7.0 and was shake-cultured for 3 hours at 37±1° C. 1 ml. of this vegetative culture was inoculated in 100 ml. of the same sterilized culture medium in 500 ml. volume Sakaguchi's flask and was shake-cultured for 3 hours at 37±1° C. 80 ml. of the latter culture was further inoculated in 2 l. of a sterilized culture medium in 6 l. volume jar fermenter, said medium containing 8.46 g./l. of $KH_2PO_4$, 2.26 g./l. of KOH, 0.5 g./l. of sodium citrate, 1 g./l. of ammonium sulfate, 0.28 g./l. of magnesium sulfate, 5 g./l. of glucose, 1 g./l. of adenine and 30 mg./l. of L-tryptophane and being also added with a small amount of silicone antifoaming agent. The inoculated medium was cultured at 37±1° C. under aeration of the same volume as that of the broth per minute and at rotation of 550 r.p.m. At 40 hours' fermentation, 938 $\gamma$/ml. of adenosine were produced. At that time the residue of adenine was 214 $\gamma$/ml. and 283 $\gamma$/ml. of hypoxanthine were produced.

Example 3

The same strain 160–88 as in the Example 2 was cultured under the same conditions. However in this example adenine was added in ten times installments (every time 0.2 g./l.) on every two hours interval so that adenine to be added may amount to 2 g./l. for 18 hours from start. Further 5 g./l. of glucose was also added in ten times installments (every time 0.5 g./l.). At 60 hours' fermentation, 1,080 $\gamma$/ml. of adenosine were formed and the residue of adenine was 708 $\gamma$/ml. At the same time 332 $\gamma$/ml. of hypoxanthine were produced.

Example 4

*Bacillus subtilis* Marburg 160–88–ad 1 was cultured in the same medium as in the Example 2, excepted only L-tryptophanae. At 48 hours' fermentation, 889 $\gamma$/ml. of adenosine were produced. The residue of adenine was 345 $\gamma$/ml. and 272 $\gamma$/ml. of hypoxanthine were also produced.

Example 5

*Bacillus subtilis* 160–88 was cultured in the aforementioned vegetative culture medium at 37±1° C. for 5 hours. 0.3 ml. of this culture were inoculated in 10 ml. of the sterilized culture medium which is similar to that of Example 2 but in addition 2.5 g./l. of L-histidine and 10 g./l. of succinic acid (in advance neutralized with NaOH) are added and cultured for 41 hours at 37±1° C. 134 $\gamma$/ml. of adenylic acid, 115 $\gamma$/ml. of inosinic acid and 77.5 $\gamma$/ml. of adenosine triphosphate were produced.

We claim:

1. Process for the production of adenosine, adenylic acid, inosinic acid and adenosine triphosphate which comprises culturing strain selected from the group consisting of purine-requiring auxotrophs derixed from *Bacillus subtilis* in a culture medium containing adenine, converting said substance to said nucleoside and nucleotide, accumulating them in the culture medium and recovering them.

2. Process for the production of adenosine, adenylic acid, inosinic acid and adenosine triphosphate which comprises culturing strain selected from the group consisting of purine-requiring auxotrophs derived from *Bacillus subtilis* in a culture medium containing adenine, converting said substance to said nucleoside and nucleotide, accumulating them in the culture medium and recovering them.

3. Process for the production of adenosine which comprises culturing strain selected from the group consisting of purine-requiring strains derived from *Bacillus subtilis* in a culture medium containing adenine, converting adenine to adenosine, accumulating it in the culture medium and recovering it.

References Cited in the file of this patent

Journal of Biological Chemistry 235, 1474–1478 (I), 2103–2108 (II), 2672–2681 (III), 1960 QP 501 J7.